UNITED STATES PATENT OFFICE.

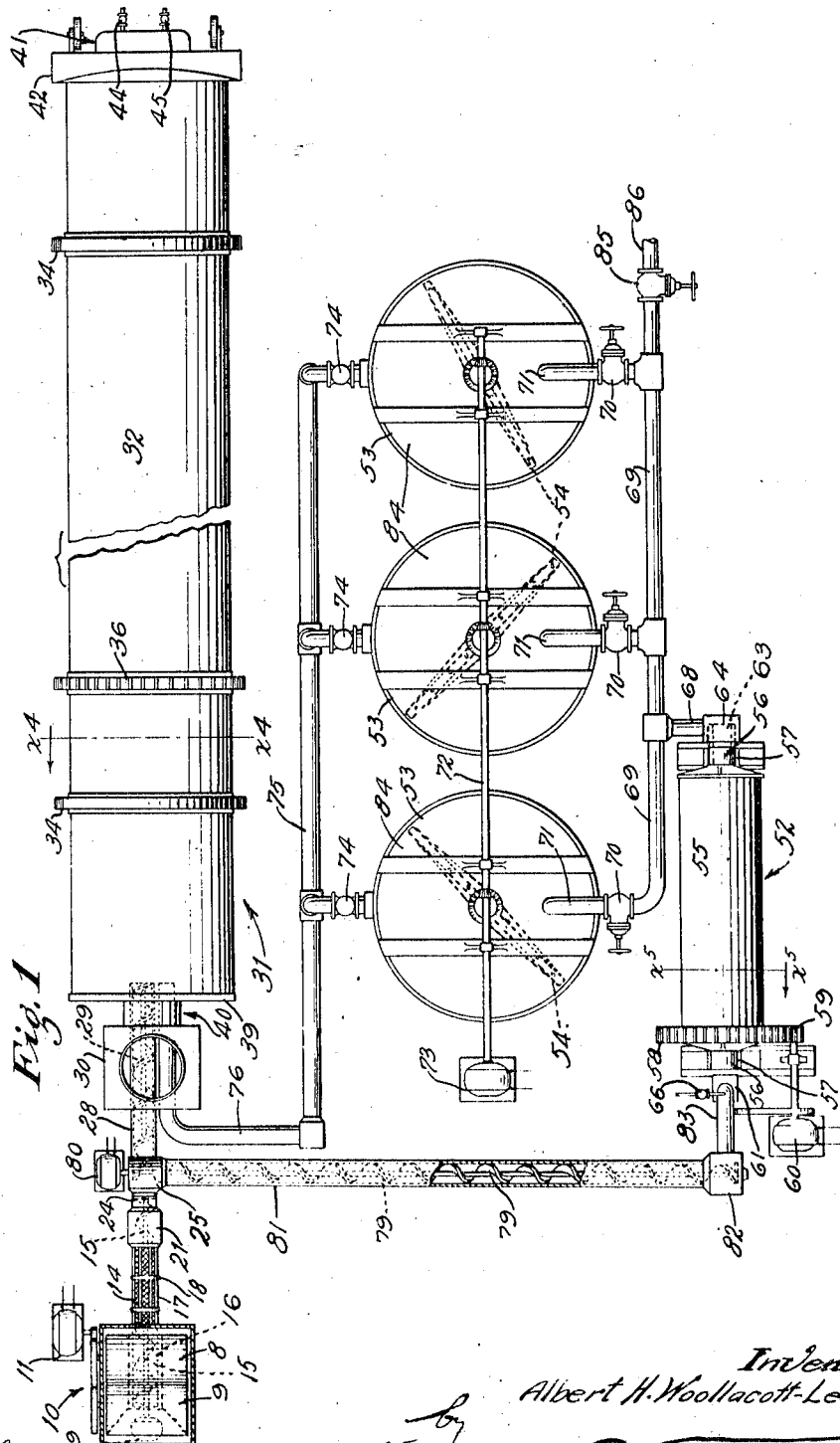

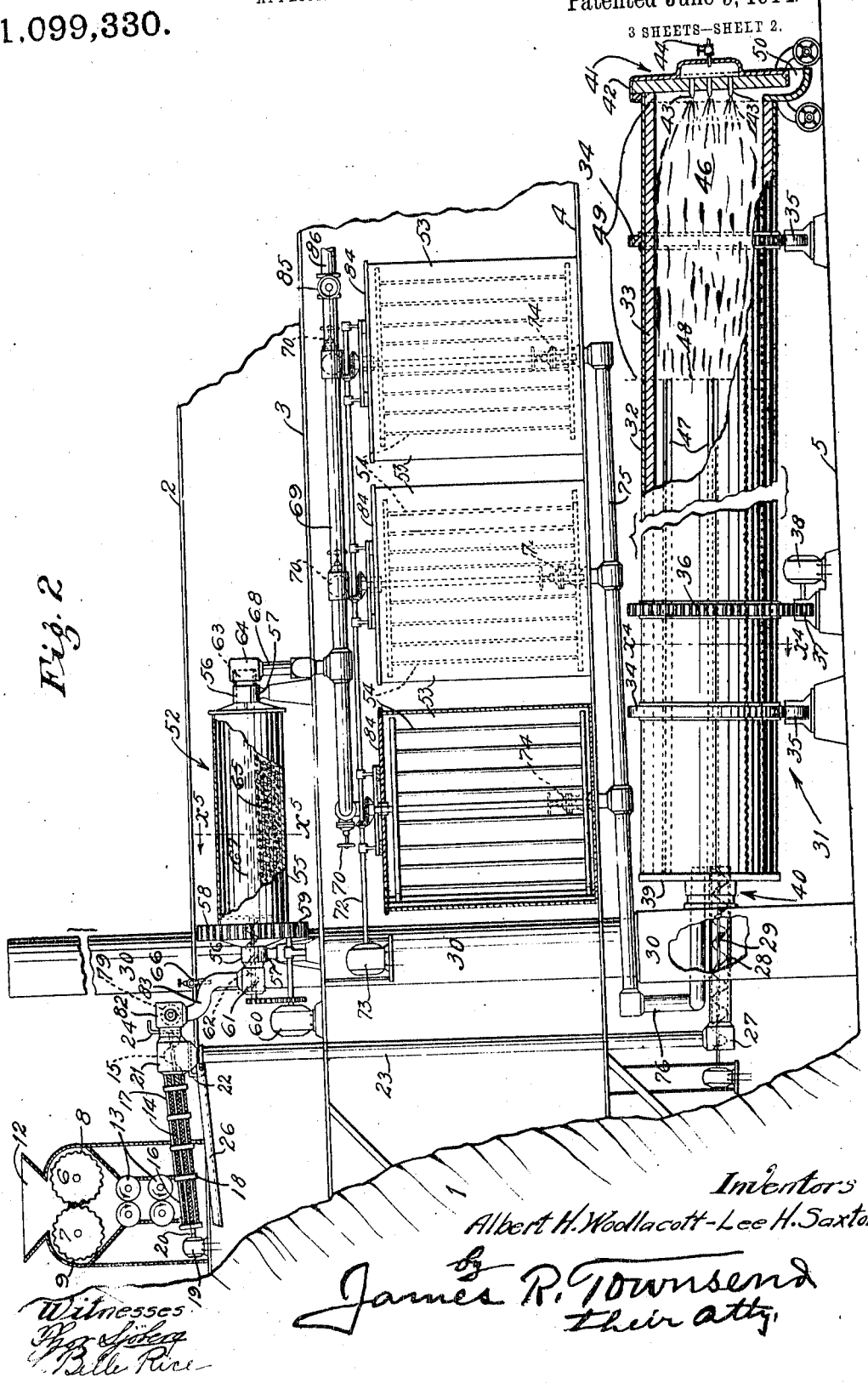

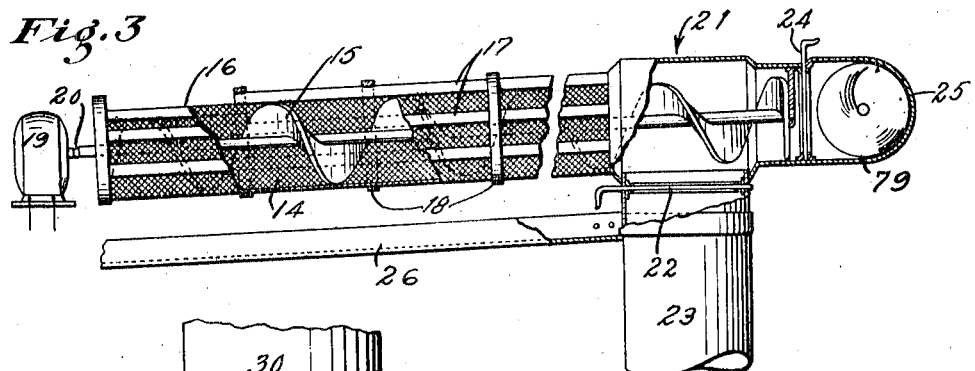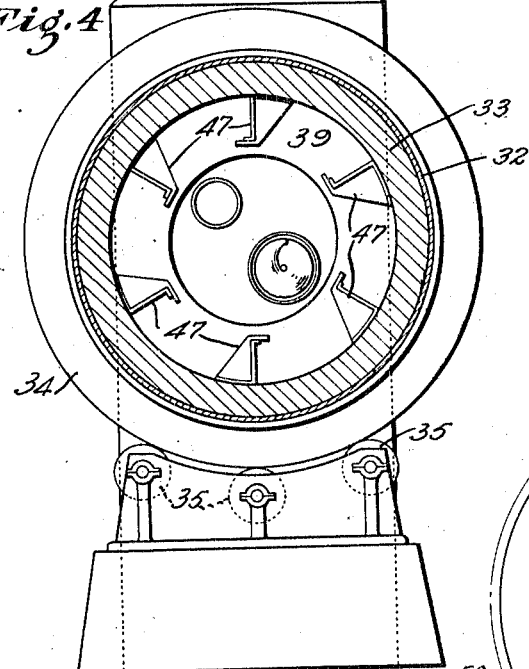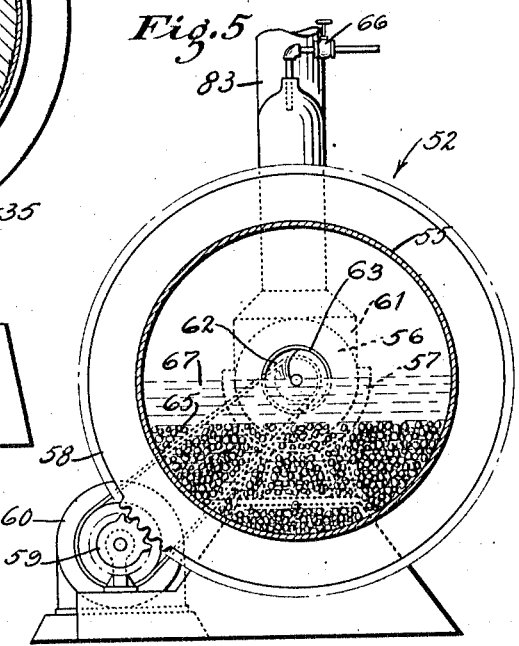

ALBERT H. WOOLLACOTT AND LEE H. SAXTON, OF LOS ANGELES, CALIFORNIA.

METHOD FOR DISPOSING OF GARBAGE.

1,099,330.  Specification of Letters Patent.  Patented June 9, 1914.

Application filed February 10, 1913.  Serial No. 747,576.

*To all whom it may concern:*

Be it known that we, ALBERT H. WOOLLACOTT and LEE H. SAXTON, both citizens of the United States, residing at Los Angeles, in the county of Los Angeles and State of California, have invented a new and useful Method for Disposing of Garbage, of which the following is a specification.

In populous cities the problem of disposing of garbage, so as to relieve the inhabitants of risk from the diseases bred thereby, has always involved serious difficulty owing chiefly to the crude and inefficient means used for destroying it. According to the usual mode of handling the problem the refuse was gathered from the city and thrown direct into large municipal stationary incinerators, wherein it was slowly burned to ashes; but this method has always involved great expense which, as compared with the amount of refuse consumed, and the capacity of the incinerators, was extravagant. Furthermore, it was impossible to properly handle a surplus which might be loaded onto the municipal plant at certain seasons of the year.

This invention relates to a novel, practical and efficient method and apparatus whereby the garbage of a city, or other gathering of people such as in great hotels, etc., may be cheaply, quickly and easily destroyed, so as to quickly remove its unsanitary features from the community, and whereby proper provisions may be had for suitably handling a surplus temporarily loaded onto the plant.

The distinctive feature of the method and the apparatus is that the garbage is first comminuted and ground to a comparatively fine consistency, and is thereafter incinerated in a rotary kiln. Either in the course of comminution or, if preferred, by separate mechanism, the water and other fluid matter is removed from the comminuted garbage before same is passed into the incinerator; and since this fluid constituent often amounts to 60 or 70 per cent. of the total garbage weight a marked fuel economy is obviously effected by avoiding the need of evaporating said fluid in the incinerator. A further economy is effected by the mere fact that the garbage is comminuted whereby a maximum surface is exposed to the hot gases passing through the incinerator. By also providing supplementary comminuting means in combination with suitably equipped storage tanks the plant is admirably adapted to handle a surplus without creating any unsanitary conditions whatsoever.

The accompanying drawings conventionally present various appliances and connections that compose the novel combination of apparatus for carrying out the method embraced in the invention.

Figure 1 is a plan view showing the apparatus conventionally, and certain parts have been broken away for purposes of clearness. Fig. 2 is an elevation of the apparatus shown conventionally and distributed on floors extending from the side of a hill. Certain parts have been broken away for purposes of clearness. Fig. 3 is an enlarged view of a portion of the apparatus used for removing fluid matter from the comminuted garbage, and also for conveying the comminuted garbage. Fig. 4 is an enlarged transverse section through the rotary kiln on line $x^4$, Figs. 1 and 2, and shows the means within the rotary kiln for raising the comminuted garbage and dropping it through the hot gases. Fig. 5 is an enlarged transverse section through the tube mill or supplementary comminuting means, said section being on line $x^5$, Figs. 1 and 2.

The figures illustrate one mode, whereby various appliances and apparatus may be arranged into an operative plant for disposing of garbage in accordance with the method of this invention; and the plant is shown as built against a hillside 1, while the apparatus is distributed on four floors, one above the other, as at 2, 3, 4 and 5, Fig. 2, respectively.

All the apparatus is indicated as being driven by electric motors, but it is understood to be so shown only for purposes of simplicity and clearness, and that belt, chain, or any other suitable driving means may be substituted.

Preferably on the upper floor 2 is located the means for comminuting the garbage, and though any suitable crushing, grinding or comminuting device whatsoever may be used for carrying out this first step in the method, this device is conventionally shown in the figures to comprise two heavy coöperating, comminuting rolls 6 and 7 having longitudinally corrugated faces 8 and 9, and being driven through the gearing 10 and motor 11, Fig. 1. The garbage as collected from the city is thrown into hopper 12, and the rolls 6 and 7 comminute it along with any hard matter, such as bones, glass, rocks, etc., that may be accidentally gathered with the garbage, and this all passes from said rolls in a comparatively fine state of comminution.

In accordance with the well-known composition of vegetable matter this comminuted garbage usually contains a large proportion of water and other fluids, and though not altogether necessary it is preferable that such fluid matter be removed so as to minimize the cost of subsequent incineration. Any suitable fluid-removing means whatsoever may be used for this purpose and may be built, either as a separate device or as a part of the comminuting means; but the figures conventionally show a series of substantially smooth compressing rolls 13 coöperating with a cylindrical foraminated trough 14 of an ascending screw conveyer 15, Figs. 1 and 3, whereby a sufficient proportion of the water, etc., may be removed from the comminuted garbage.

The garbage, after being suitably comminuted, drops onto rolls 13 which are connected with driving machinery, (omitted from the figures) and rotate as indicated by the arrows on their faces, Fig. 2. These rolls substantially contact with each other and as the comminuted garbage is pressed between them the water and other fluids are squeezed from the vegetable cells and said garbage, in addition to being further comminuted is pressed into a comparatively dry pulp. From the lowermost rolls 13 the pulp and fluids drop through the opening 16, Fig. 3, in the upper portion of the ascending cylindrical foraminous trough 14. This trough is preferably built of some strong metallic screening material suitably reinforced by longitudinal and peripheral stays 17 and 18 respectively; and within said trough operates the screw conveyer 15 which is driven by motor 19 through a ball and socket joint 20. At the outer end trough 14 communicates with a closed hopper 21, and the latter is provided below with a slide or gate valve 22 communicating with chute 23; and the said hopper is also provided at its end with another slide or gate valve 24 communicating with a hopper 25.

After the expressed fluids and comparatively dry pressed pulp drop through opening 16 onto the foraminated trough 14 the fluid matter immediately begins to drain off through the foraminations in the trough. The pulp, however, remains behind and is screwed along the ascending trough by means of conveyer 15. It will be noticed that by conveying the comminuted or pulped garbage upward along the ascending trough the conveyer must exercise a certain lifting or pressing effort, which constantly tends to further squeeze the fluids out from the comminuted garbage and to eject the fluid matter through the foraminations of the trough 14. After the pulp reaches its greatest elevation in hopper 21 it will be practically free of water and other fluids. Another trough or pan 26 is preferably provided beneath the foraminated trough 14, so that the fluid issuing from the latter may be caught and run off to any suitable place, not shown in the figures.

Usually the gate 24 is closed while gate 22 is open, so that the comminuted garbage will drop through tube 23 into the hopper 27. This hopper communicates with another tube 28 equipped with a suitably-driven conveyer 29; and the tube 28 passes through the chimney 30 and into the incinerating means 31, which comprises a long rotary kiln suitably mounted and driven as hereinafter described. This kiln essentially comprises a strong metallic cylindrical tube 32, Figs. 2 and 4, internally lined with firebrick 33, and said tube is circumferentially provided with heavy supporting flanges 34 adapted to rest and rotate easily on rollers 35. For the purpose of rotating said kiln it is also circumferentially provided with a strong annular gear 36 which is driven by pinion 37 and motor 38. At the end, through which tube 28 and conveyer 29 enter, the kiln is provided with a closing plate 39 having a common swivel connection 40 with the flue or smoke-stack 30 whereby the hot gases formed within the kiln may be drawn off. At the other end of the kiln are provided means 41 for forming and driving hot incinerating gases through the tubular kiln. This means comprises a suitably-lined shell or cover 42 adapted to pass over the end of tubular drum 32 of the kiln, and though any suitable form of fire or heat-producing means may be used the figures conventionally show jets 43 which are supplied, in any well-known manner, with compressed air and oil or gases through valved pipes 44 and 45 respectively. When a proper admixture of compressed air and fuel issues from jets 43, the same may be ignited to create a powerful and hot flame 46, the hot gases of which drive through the rotating kiln and escape through stack 30. In order that the heat of said gases may be more thoroughly and efficiently applied, there is provided within said kiln means for raising the garbage and dropping it through the hot gases. The most common means available for this purpose comprises wings 47, Figs. 2 and 4, carried internally on the rotating kiln and extending from the end plate 39 to an imaginary line 48, marking the outer limit of the primary heat zone 49. It will be also noticed from Fig. 2 that the kiln mounting is such that its axis is inclined to a horizontal line, and this feature, together with the operation of wings 47, will cause the comminuted garbage to travel downward along the kiln and will permit any ash residue to escape from same through hopper 50 in the cover 42.

The novel combination of apparatus thus far described is usually employed in carrying out the method of this invention; and this apparatus comprises the means for comminuting the garbage, the means for incinerating the comminuted garbage, and means for conveying the garbage from said comminuting means to said incinerating means. In view of the finely divided or comminuted state of the garbage in the rotary kiln, the same is readily and economically consumed by the application of minimum heat; and as already stated the operation of wings 47 keep the garbage constantly exposed to the hot gases passing through the tubular kiln, so as to further reduce the expense of incineration. From this it will be seen that economy, and thoroughness of incineration, are among the most prominent features of this invention.

By supplying a large quantity of heat from nozzles 43 and by rotating the kiln slowly, so as to cause a slow passage of the comminuted garbage through same, the garbage and other matter may be completely consumed, and caused to pass off as vapor through stack 30; or by reducing the heat supplied at nozzles 43 and by rotating the kiln rapidly, so as to hasten the passage of the garbage through same the garbage may be only partially consumed and the residue permitted to pass out through hopper 50. This residue may be used as a fertilizer and constitutes a valuable by-product of this method.

In the practical operation of the apparatus hereinbefore described it happens from time to time, either that the operation of the kiln must cease temporarily in order to permit the repairing of same, or else that a surplus quantity of garbage is temporarily loaded onto the plant over and above its maximum incinerating capacity. In either of these cases, it is necessary to temporarily store the whole, or the surplus portion of the garbage, and the apparatus whereby this temporary storing can be sanitarily and practically accomplished will now be described. It comprises supplementary comminuting means 52, storage tanks 53, rotary agitators 54 in the tanks, and suitable means for controlling and conveying the garbage to the supplementary comminuting means, from said comminuting means to said tanks, and from said tanks to the rotary kiln. In providing for a temporary storage of the garbage the following features are involved. The supplementary grinding means 52 preferably operates in such manner that the garbage passed into it is comminuted until it forms a thick semi-fluid slurry of such plastic constituency as to flow through tube connections hereinafter described. From the supplementary comminuting means the slurry passes into tanks 53, where the agitators 54 stir it constantly, so as to prevent it becoming set and solid in the tanks. By continuing the agitating operation the slurry may be stored in the tanks a long time until ready to be run into the kiln for incineration.

In the drawings, one form of means 52 for carrying out the supplementary comminution is conventionally shown in the form of a tube or pebble mill. This mill comprises a large metallic drum or tube 55 equipped with hollow cylindrical supporting heads 56, by means of which said tube is rotatively mounted on the bearing means 57. For the purpose of rotating said tube mill an annular gear 58 is externally mounted on tube 55 and this gear is driven by the pinion and motor 59 and 60, respectively. At the receiving end of the mill there is stationarily located a hopper 61 into which the garbage is conveyed by means to be hereinafter described; and from said hopper the garbage is fed by a suitably-driven screw conveyer 62, Fig. 2, through an aperture 63 in hollow head 56, Fig. 5, and from thence into the tube 55. At the discharge end of said mill the head 56 is formed with a similar aperture 63 from which the slurry drops into hopper 64. Within the tube mill there is a layer 65 of pebbles or other suitable hard bodies; and as the garbage drops into the rotating tube 55 these pebbles roll and slide around each other so as to comminute the garbage to an impalpable condition. On account of the residual moisture usually remaining in the garbage the impalpable refuse mixes with its own moisture to form the slurry previously referred to. In case the garbage, which passes into the mill, is too dry to form the semi-fluid slurry a proper amount of water may be added by means of the water supply 66 entering the system above hopper 61. The garbage is regularly fed into the mill and after the slurry, represented by layers 67, Figs. 2 and 5, rises to a level above the bottom of aperture 63 in the discharge head 56, Fig. 2, it will flow or discharge itself through the aperture into hopper 64. From this hopper it flows through conveying tube 68 into the conveying main 69 from which it is distributed by valves 70, and branches 71, into the storage tanks 53. In the figures three tanks are shown, but any other suitable number may be used, and the rotary agitators 54 in said tanks may all be driven by lay shaft 72 and motor 73. While the slurry is being stored, either to permit the repairs on the kiln or to permit the incineration of the bulk of the garbage, the stirring action of the agitators will keep it sufficiently fluid-like, so that it will pass out freely when valves 74 are opened. From these valves the slurry will pass though suitable conveying means including tubes or mains 75 and 76, which discharge it into the rotary kiln in an obvious manner.

It will be understood that any proportion of the total garbage may be passed through the tube mill and tanks, and that the garbage may be led to said mill in any suitable manner. The figures, however, illustrate a convenient means whereby the total garbage may be passed between the primary comminuting rolls 6 and 7; and whereby a variable proportion of said total may then be conveyed and shunted through the tube mill and storage tanks, while the rest passes directly through the kiln. As much of this means as conveys the garbage from the primary comminuting rolls to hopper 21 has already been described, and from this hopper the said means lead into hopper 25 through a gate 24. The screw conveyer, indicated at 79, Fig. 1, and driven by motor 80 projects into hopper 25 to receive and propel the garbage coming through gate 24. The conveyer 79 propels this garbage transversely through tube 81 into hopper 82 from whence the said garbage flows by gravity through tube 83 into the receiving hopper 61. From this hopper it is conveyed into the supplementary comminuting means 52 in a manner hereinbefore described.

With the foregoing arrangement the proportions of the garbage, which pass direct to the rotary kiln, or pass through the tube mill and storage tanks, may be varied by the independent but simultaneous operation of gates 22 or 24, Fig. 3. If the rotary kiln is stopped for repairs gate 22 is shut completely, while gate 24 is opened, and all the garbage will pass into the tube mill and storage tanks where it is kept until the repairs are finished. After the kiln is operated again the tank valves 74 are, of course, opened, and the slurry passed into the incinerator. If the rotary kiln, however, is operating under full capacity and a surplus quantity of garbage is loaded onto the plant the gate 22 may be left wide open, so that the incinerator may take its full charge directly from the hopper. The slide 24 is also opened a sufficient amount to take the surplus through the tube mill from whence it is distributed and stored in the tanks. After the surplus has been properly brought down gate 24 may be closed, and at the earliest opportunity, when the plant runs slack, the surplus is run off from the storage tanks into the incinerator and this may be done, even while the incinerator is receiving its reduced charge directly from the comminuting rolls 6 and 7.

There is no danger of breeding disease in view of the storage of the garbage in the tanks, because this may be properly sealed by the closure 84 through which branch tubes 71 extend. With this provision added to the system it is seen that after the garbage is admitted into hopper 12 it is thereafter kept within closed machinery, until incinerated in the rotary kiln, and by this sanitary provision the risk of propagating and spreading disease germs is eliminated.

It will, of course, be understood that this invention contemplates such modifications as the addition of one or more incinerating kilns, which may operate separately or jointly, either to permit repairs on one or to handle the total surplus directly as required. It will also be understood that the distributing main 69 may have a valve 85 which is normally closed. A portion 86 of this main, beyond this valve, is shown broken off in Fig. 1, but it is contemplated that this portion shall connect with a large well-flushed sewer such as is usually found in cities, and that at times when the plant is abnormally overloaded valve 85 may be opened to discharge a large proportion of the slurry into the sewer.

From the foregoing detailed description it is believed that the novel combination of apparatus used for carrying out this invention will be clear, and that the economy, convenience and practicability of the method will be apparent.

We claim:—

1. The method described for disposing of garbage, which method comprises reducing said garbage to a semi-fluidic slurry, agitating said slurry, and subsequently drying and burning said slurry while in an agitated state.

2. The method for disposing of garbage, said method comprising the comminution of said garbage so as to reduce it to a semifluidic slurry, the stirring of said slurry during its storage and the subsequent incineration of said slurry.

3. The method for disposing of garbage, said method comprising the comminution of said garbage so as to reduce it to a semifluidic slurry, the storage of said slurry in substantially air-tight tanks, said slurry being subject to a stirring action during said storage and the subsequent treatment of said slurry by continuously lifting and dropping it through an ascending incinerating flame.

In testimony whereof, we have hereunto set our hands at Los Angeles, California, this 3d day of February, 1913.

ALBERT H. WOOLLACOTT.
LEE H. SAXTON.

In presence of—
JAMES R. TOWNSEND,
ROBERT G. STEPS.